United States Patent
Sun et al.

(10) Patent No.: US 10,316,727 B2
(45) Date of Patent: Jun. 11, 2019

(54) ISOLATOR IN A VEHICLE EXHAUST SYSTEM AND AN EXHAUST SYSTEM INCLUDING THE SAME

(71) Applicant: Ford Global Technologies LLC, Dearborn, MI (US)

(72) Inventors: Daniel Sun, Nanjing (CN); Max Wang, Nanjing (CN); Robben Huang, Nanjing (CN)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 15/824,807

(22) Filed: Nov. 28, 2017

(65) Prior Publication Data
US 2018/0156102 A1   Jun. 7, 2018

(30) Foreign Application Priority Data
Dec. 2, 2016   (CN) .......................... 2016 1 1100592

(51) Int. Cl.
*F01N 13/18* (2010.01)
*F16L 3/16* (2006.01)
*F16L 55/035* (2006.01)

(52) U.S. Cl.
CPC ............ *F01N 13/1822* (2013.01); *F16L 3/16* (2013.01); *F16L 55/035* (2013.01); *F01N 2530/22* (2013.01)

(58) Field of Classification Search
CPC ............. F01N 13/1811; F01N 13/1822; B60K 5/1225; B60K 5/1241; B60K 5/1283; F16F 9/0418; F16F 9/0427; F16F 9/049; F16L 3/21; F16L 3/2053; F16L 3/2056; F16L 55/035
See application file for complete search history.

(56) References Cited

U.S. PATENT DOCUMENTS

| | | | |
|---|---|---|---|
| 2,318,862 A * | 5/1943 | Kraft ..................... | B64D 27/04 244/903 |
| 4,634,088 A | 1/1987 | Schad | |
| 6,095,460 A | 8/2000 | Mercer et al. | |
| 7,644,911 B2 | 1/2010 | Rodecker | |
| 2009/0230601 A1 | 9/2009 | Lenda | |
| 2015/0292666 A1* | 10/2015 | Noll ....................... | B60K 13/04 248/636 |

FOREIGN PATENT DOCUMENTS

| DE | 3346609 A1 | 7/1985 | |
|---|---|---|---|
| EP | 2402636 A1 * | 1/2012 | ............ F16L 3/2053 |
| WO | WO-8912764 A1 * | 12/1989 | ............ F16F 9/0427 |

\* cited by examiner

*Primary Examiner* — Jonathan R Matthias
(74) *Attorney, Agent, or Firm* — Julia Voutyras; Kolitch Romano LLP (57) ABSTRACT

An isolator in an exhaust system of a vehicle is provided. The isolator comprises a bracket to be connected with an under body of the vehicle; and a gas filled cushion at least partially embedded in the bracket. The cushion is formed to have a through hole in a middle portion and the through hole is configured to receive a hanger connected to an exhaust system.

18 Claims, 5 Drawing Sheets

ISOLATOR IN A VEHICLE EXHAUST SYSTEM AND AN EXHAUST SYSTEM INCLUDING THE SAME

RELATED APPLICATION

This application claims the benefit of Chinese Patent Application No.: CN 201611100592.X filed on Dec. 2, 2016, the entire contents thereof being incorporated herein by reference.

FIELD

The present application relates an isolator in a vehicle exhaust system and an exhaust assembly including the same, in particular, an isolator with a gas filled cushion.

A vehicle typically includes an exhaust system to treat the exhaust from an engine operation before discharging to ambient air. The exhaust treatment system often includes an exhaust pipe, a muffler to reduce the noise, a catalytic converter to treat the exhaust gas. The treated exhaust gas is routed to a desired position of the vehicle such as a rear of the vehicle and discharged. The exhaust system is usually connected to a vehicle frame or a vehicle body via a support structure or a suspension structure. To prevent a vibration from the engine to be transferred to the vehicle body via the exhaust system, an elastic member is typically used to connect the exhaust system to the vehicle body. The elastic member is typically made from a solid rubber or other elastic material to provide isolation to the vibration. Some designs use grooves or protrusions on the rubber surface to enhance an efficiency of isolation. For example, U.S. Pat. No. 7,644,911B2 discloses an elastomeric isolator including an elastomeric body which defines a void extending into the elastomeric body from one side and a void extending into the elastomeric body from the opposite side. One member for attaching the elastomeric body to a component is located inside of the two voids and another member for attaching the elastomeric body to a component is located outside of the two voids. The two voids overlap a specified distance to determine the stresses and stiffness for the isolator. The inventors have recognized that such design needs to use solid rubber or elastomeric materials, which not only consumes material and also has a complex structure, and complicated installing process. In addition, the configuration of the rubber and elastomeric parts may need to be changed to have different stresses and rigidness to adapt to different types of vehicles, and thus the isolator may not be versatile.

Another U.S. Pat. No. 4,634,088 discloses an elastic isolator comprising a hollow body. The hollow body is filled with air and each face of the hollow body is provided with lugs, respectively. The lugs are engaged to the hooks disposed on the vehicle body and the exhaust pipe, respectively. However, the inventors have recognized that the contact areas between the lug and the hook are small and can move relative each other. Thus, the vibration from the exhaust system may not be absorbed effectively.

SUMMARY

According to one aspect, an isolator in an exhaust system of a vehicle is provided. The isolator comprises a bracket to be connected with an under body of the vehicle; and a gas filled cushion at least partially embedded in the bracket. The cushion is formed to have at least one through hole in a middle portion and the through hole is configured to receive a hanger connected to an exhaust system.

In one embodiment, the bracket may include two arms pivotably connected with each other at one end, and the cushion is embedded in the two arms.

In another embodiment, the two arms of bracket may be releasably connected with each other on another end through a locking device to lock the cushion in the bracket.

In another embodiment, the cushion may have an annular ring shape and is made of elastic material and the bracket has a circular inner wall.

In another embodiment, the cushion may be hermetically sealed and filled with the gas at a predetermined pressure.

In another embodiment, the cushion may further comprise a valve to charge the gas and adjust a gas pressure in the cushion.

In another embodiment, the cushion may include one hermitically sealed cavity surrounding the through hole.

In another embodiment the cushion may include a plurality of hermitically sealed cavities surrounding the through hole, and at least one hermitically sealed cavities may be capable of being unsealed for gas pressure adjustment.

In another embodiment, a wall of the through hole formed by a surface of the cushion may include a plurality of protrusions configured to prevent the hanger from sliding away from the cushion.

According to another aspect of the present disclosure, an exhaust system of a vehicle having a vehicle underbody is provided. The exhaust system comprises a hanger; an exhaust pipe connected to the hanger; a rigid bracket to be connect with the vehicle underbody; and a gas filled cushion at least partially embedded in the rigid bracket. The cushion has an annular shape and includes at least one through hole to receive the hanger of the exhaust pipe.

In one embodiment, the rigid bracket may include two arms pivotably connected with each other at one end via a pivot, a cross-section of the two arms may have a U shape, and the cushion may be embedded in the two arms.

In another embodiment, the two arms of the rigid bracket may be releasably connected with each other on another end through a locking device for locking the cushion inside the rigid bracket, and the two arms collectively form an annular shape when connected on both ends.

In another embodiment, the cushion may have a circular shape and may be made from elastic material, and the rigid bracket may be made from metal or alloy.

In another embodiment, the cushion may include a valve to charge and discharge the gas and adjust a gas pressure inside the cushion.

In another embodiment, the cushion may include one hermitically sealed cavity surrounding the through hole.

In another embodiment, the cushion may include a plurality of hermitically sealed cavities surrounding the through hole, and at least one hermitically sealed cavities may be capable of being unsealed for gas pressure adjustment.

In another embodiment, a wall of the through hole formed by an inner surface of the cushion includes a first plurality of protrusions adjacent to a first main surface of the cushion and along a circumference of the through hole and a second plurality of protrusions adjacent to a second main surface of the cushion and alone a perimeter of the circumference of the through hole. The first main surface is opposite to the second main surface, and the first and second plurality of protrusions are configured to prevent the hanger from being disengaged from the cushion.

In another embodiment, the hanger may include a connection portion to be disposed inside the through hole of the gas filled cushion, and the connection portion may include a first region and a second region having varied cross-sectional areas. The cross-sectional areas adjacent to the first and second plurality of protrusions are greater than cross-sectional areas between the first and second plurality of protrusions.

According to yet another aspect of the present disclosure, an exhaust system isolator in a vehicle is provided. The exhaust system comprises an annular rigid bracket and a gas filled cushion disposed in the rigid bracket and having an annular ring shape and a through hole. The annular rigid bracket includes at least one protrusion having a connection hole for connection with an under body of the vehicle. A gas is filled in a cavity of the gas filled cushion and the through hole of the cushion is configured to receive a hanger to be connected to an exhaust system.

In one embodiment, the cushion may be made of elastic material and the cushion may include a valve to control a gas pressure in the cushion to vary stiffness of the cushion. The gas may be an air, nitrogen, or an inert gas.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed isolators in an exhaust system of a vehicle will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various isolators and isolator assembly in a vehicle are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

When referencing the figures, please note that same labels are represented same members. In description below, different parameters and parts are used to describe different configured embodiments. These parameters and parts are only used for exemplary, but don't mean limits.

The isolators of the present disclosure can simplify the assembling of the isolator to a vehicle body and an exhaust system. The isolator with a gas filled cushion saves the amount of the elastic material such as rubber compared to conventional technologies. Further, the isolator has a simple structure and is easy to manufacture and assemble. Furthermore, the stiffness or hardness of the isolator can be attuned by adjusting air pressure in the cushion and thus one design/configuration can meet different requirements for support and isolation of different types of vehicles.

Figure 1:
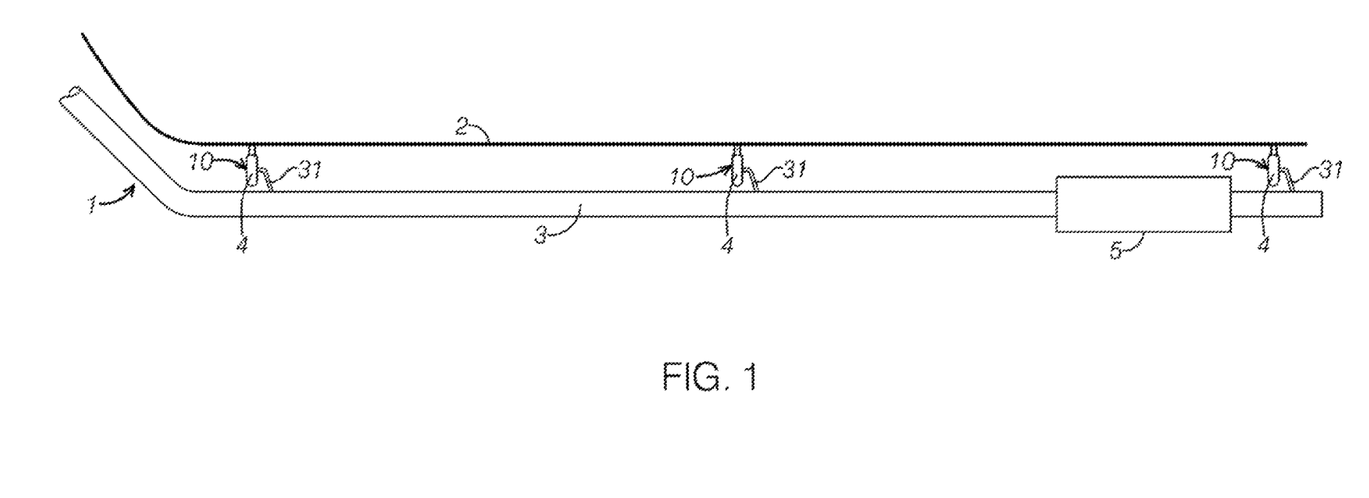
FIG. 1 schematically depicts a portion of exhaust system connected to an underbody of a vehicle and an exhaust system isolator according to one embodiment of the present disclosure.
Figure 2:
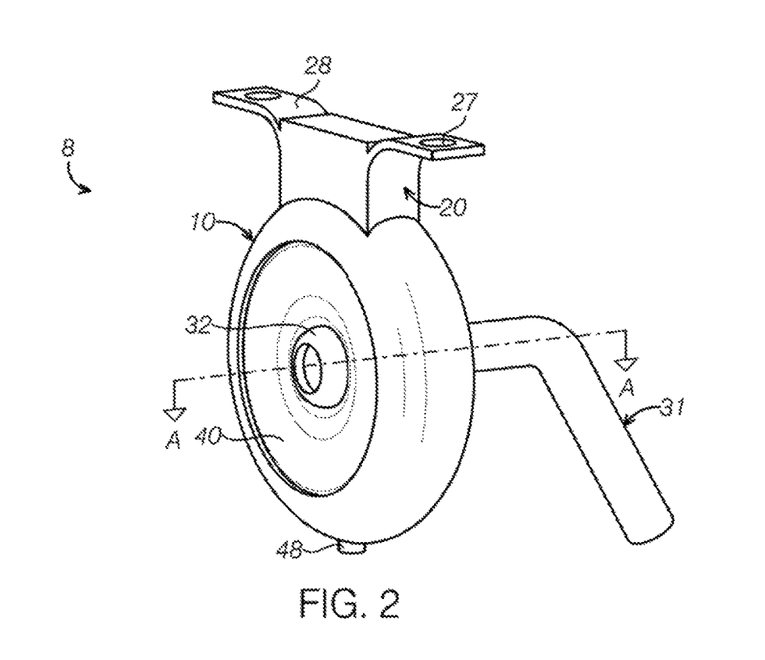
FIG. 2 schematically depicts a perspective view of an isolator assembly in an exhaust system of a vehicle according to one embodiment of the present application.

FIG. 1 schematically shows a portion of an exhaust system 1, illustrating a connection of an isolator 10 to a vehicle underbody 2 and an exhaust pipe 3. As shown in FIG. 2, a plurality of isolators 10 are disposed along a length of the vehicle between the underbody 2 and the exhaust pipe 3. The exhaust pipe 3 includes a plurality of hangers 31. One end of the isolator 10 is connected to the vehicle underbody 2 and a middle portion 4 of the isolator 10 is connected to the hanger 31. That is, the exhaust system 1 is connected to the vehicle underbody 2 via the isolator 10. FIG. 1 also shows a muffler 5. As described in detail below, the middle portion 4 of the isolator 10 includes a cushion filled with gas and configured to absorb vibration from exhaust system of the vehicle. The vibration transmitted from the exhaust system 1 to a vehicle body can be reduced or eliminated due to the absorption by the cushion 40.

FIG. 2 is a perspective view of an isolator assembly 8 of an exhaust system in a vehicle according to one embodiment of the present disclosure. The isolator assembly 8 includes an isolator 10 and a hanger 31. The isolator 10 includes a bracket 20 and a cushion 40 embedded in the bracket 20. A connection portion 32 of the hanger 31 may be used to attach the hanger 31 to the isolator 10. The bracket 20 may be connected to an underbody of the vehicle via with any appropriate approaches such as screw connection or rivet connection. The exhaust system is connected to the underbody of the vehicle via the hanger 31 connected to the cushion 40.

Figure 3:
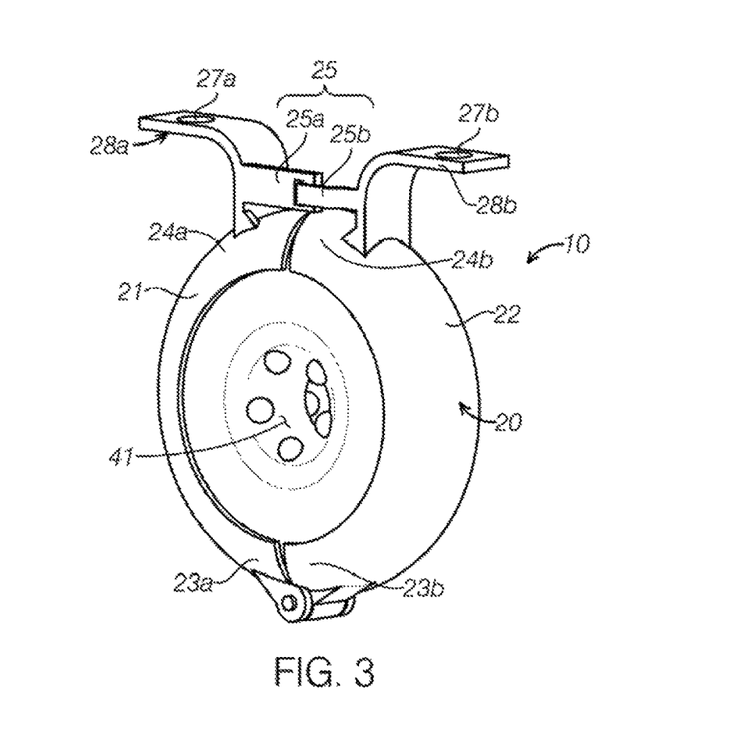
FIG. 3 schematically depicts a perspective view of an isolate in an exhaust system of a vehicle according to one embodiment of the present disclosure.
Figure 4:
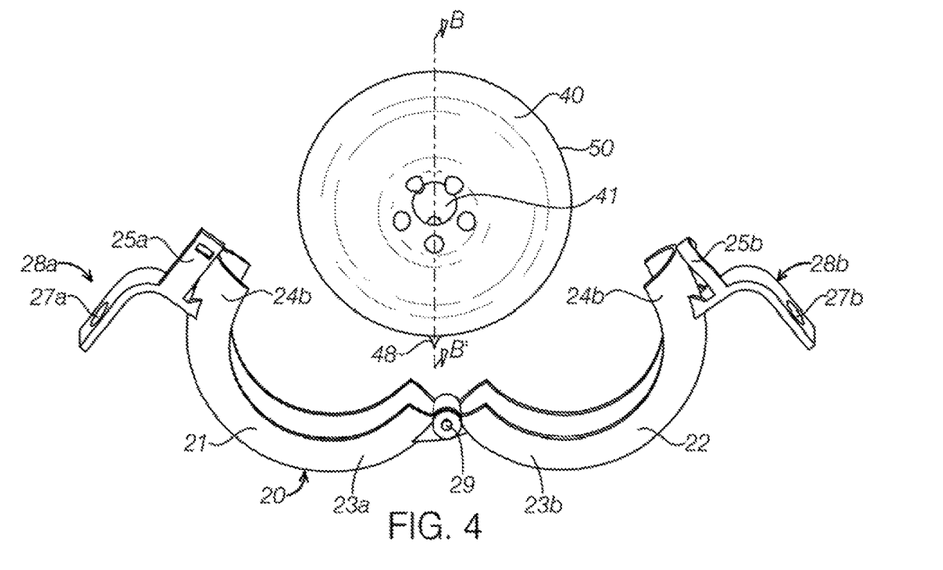
FIG. 4 is an exploded view of the isolator in FIG. 3.

FIGS. 3, 4, 5, and 6 are perspective views of the isolator assembly or the isolator in FIG. 2 from different angles. As shown in FIGS. 3 and 4, the bracket 20 includes a first arm 21 and a second arm 22 pivotably connected. In some embodiments, the first and second arms 21, 22 may have similar structures. The first and second arms 21, 22 may include a first end 23a, 23b, respectively which are pivotably connected via a pivot 29 and a second end 24a, 24b, respective which are detachably connected via a locking device 25. The locking device 25 may include a first locking portion 25a disposed on the first arm 21, and a second locking portion 25b disposed on the second arm 22. The first and second arms 21, 22 of bracket 20 with the detachable structure can be opened during the assembling process to place the cushion 40 in the bracket 20 and then connected by the locking device 25 such that the cushion 40 is embedded in the bracket 20. Each or the first and second arms 21, 22 may have a semi-circular shape to form an annular shape corresponding to an outer perimeter of the cushion 40. That is the bracket 20 may be a ring-shaped bracket.

Figure 5:
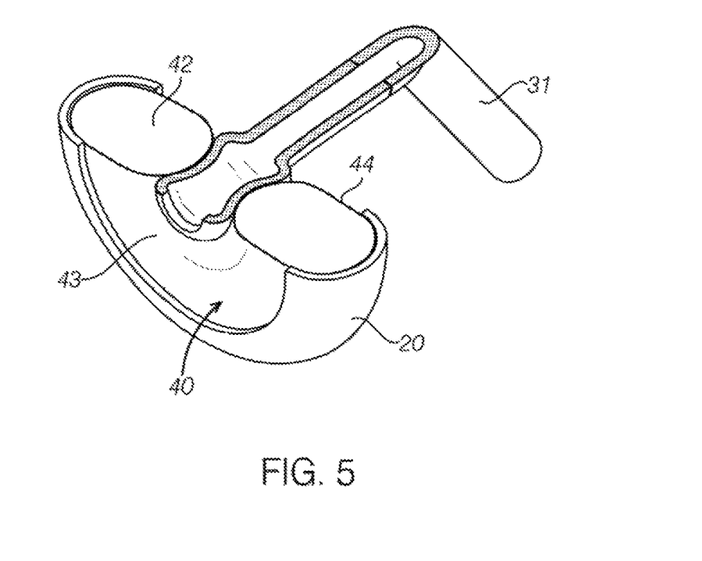
FIG. 5 schematically depicts a cut away view of the isolator assembly in FIG. 2 at a cross section A-A.

As shown in FIGS. 4 and 5, the first and second arms 21, 22 may have a U shaped or a semi-circular shaped cross section or any shapes corresponding to the outer surface of the cushion 40 such that the cushion 40 can match an outer surface of the cushion 40 better and be firmly embedded in the two arms. Referring to FIGS. 3 and 4, the first arm 21 may include a first protrusions 28a at the second end 24a and a second arm 22 may include a protrusion 28b at the second end 24b. A first hole 27a and a second hole 27b may be formed on the protrusion 28a and 28b, respectively. The first locking portion 25a may be formed on the first protrusion 28b and the second locking portion 25b may be formed on the second protrusion 28b. The bracket 20 may be installed on the underbody of the vehicle via screws or rivet passing through the first and second holes 27a, 27b or other appropriate approaches. The bracket 20 may be made from rigid material like stainless steel, cast iron, alloy, or hard plastic. Comparing to the isolators of the exhaust system made entirely from elastic material, a rigid bracket can provide firm support to an exhaust system connected on the vehicle underbody, and a rigid bracket is not easy to age compared to the rubber.

Referring to FIGS. 3 to 5, the gas filled cushion 40 may include at least a through hole 41 formed at middle portion of the cushion 40 to receive the hanger 31 connected to the exhaust pipe. That is, the cushion 40 may have an annular ring shape. Alternatively, the cushion 40 may include a plurality of through holes to adapt to the different hangers of exhaust systems. In some embodiments, the cushion 40 may include one hermetically sealed cavity 42 surrounding the through hole 41. Gas is hermetically sealed in cavity 42 and the cushion 40 has a structure like a ring-shaped flotation device or a tire. The cushion 40 may be filed with gas with predetermined pressure. Compared to the isolator made all from solid elastic material or mostly made from solid elastic material, the cushion 40 has a hollow body and less material is used. Thus, the isolator 10 saves the cost. Since the cushion 40 has a hermetically sealed cavity, the cushion 40 has better elasticity to isolate vibration than an isolate made from a solid part. In addition, the through hole 41 of the cushion 40 provides a greater contact area with the hanger of the exhaust system. The vibration from the exhaust system is absorbed first by touching the surface and then absorbed further by the entire cushion 40, and thus isolation from the vibration from the exhaust system can be improved.

Figures 6, 7:
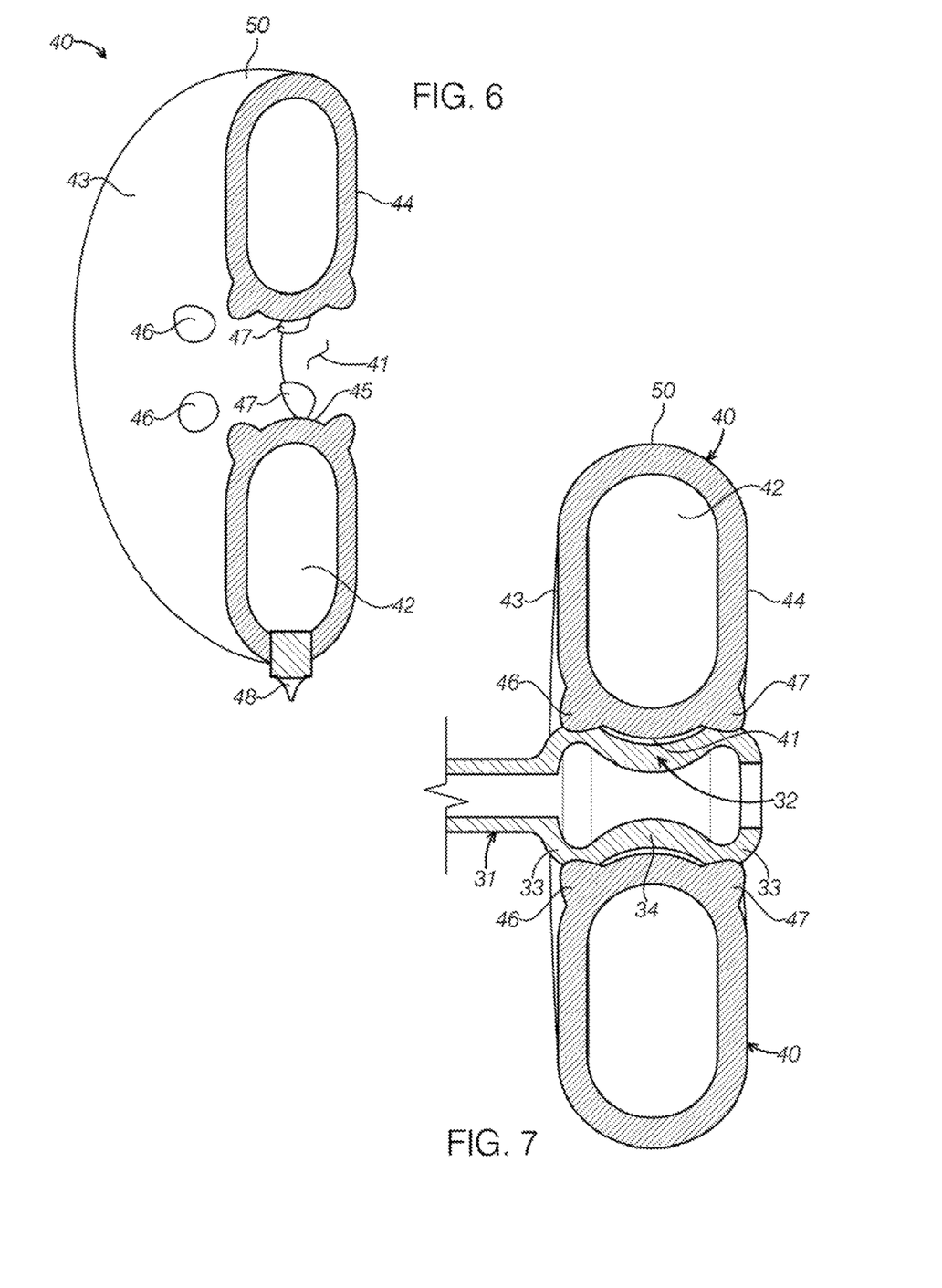
FIG. 6 schematically depicts a cushion of the isolator in FIG. 4 from a cross section B-B.
FIG. 7 schematically depicts a cross sectional view of the cushion in FIG. 6, illustrating a connection of the cushion with a hanger.

Referring to FIGS. 5 and 6, the cushion 40 may have an annular shape having a first main surface 43 and a second main surface 44 opposite to and substantially parallel to the first main surface 43, an inner surface 45 and an outer surface 50. The inner surface 45 defines the through hole 41 or forms a wall of the through hole 41. The inner surface 45 or wall 45 of the through hole 41 of the cushion 40 may include a plurality of projections to enhance friction and prevent the hanger 31 from being disengaged. In one embodiment, the wall 45 of through hole 41 includes a plurality of first projections 46 adjacent to the first main surface 43 of the cushion and distributing along a circumference of the through hole 41 and a plurality of second projections 47 adjacent to the second main surface 44 and distributing along the circumference of the through hole 41.

Referring to FIG. 6, the cushion 40 may further include a valve 48 connected to the sealed cavity 42 of the cushion 40. The valve 48 may be positioned at any appropriate place on the surface of the cushion 40. In the embodiment depicted in FIGS. 2 and 6, the valve 48 is located a place adjacent to the pivot 29 of the bracket 20. The valve 48 may pass through the bracket 20. The cavity 42 may be filled with gas before or after installation of the cushion 40 via the valve 48. The gas may be air, nitrogen, other inert gas. The valve 48 may further be used to adjust a gas pressure in the cushion 40 such that the isolator 10 may be configured to have different stiffness to meet rigidness requirement for the different vehicles. In other words, the isolator can have one configuration but the parameters for the isolation requirement may be adjusted by the gas pressure in the cushion for different types of the vehicles. Thus, the isolator can be versatile in its application.

FIG. 7 is a cross-sectional view of the isolate 10 in FIG. 2, illustrating connection of a hanger 31 with the cushion 40. For the clarity, the bracket 20 is not shown in FIG. 7. With further reference to FIG. 1, the hanger 31 is used to connect the exhaust system 1 to the underbody 2 of the vehicle and suspend the exhaust system 1 under the vehicle underbody 2 via the isolator 10. The hanger 31 may be integrated formed with the exhaust pipe 3 of the exhaust system 1 or may be detachably connected to the exhaust system 1. The hanger 31 includes a connection portion 32 that may be placed in the through hole 41 of the cushion 40 and has varied cross sectional areas. In one embodiment, the connection portion 32 has a first region 33 adjacent to the plurality of first projections 46 and the plurality of second projections 47 of the cushion 40 and a second region 34 between the first projections 46 and second projections 47 of the cushion 40. The first region 33 has a cross section area greater than that of the second region 34. The connection part 32 with varied cross-section areas can match better with the structure of the through hole 41. As shown in FIG. 7 and with further reference to FIG. 6, the inner surface 45 may extend toward a center axis and have an arc shape because the inner wall of the through hole is not a cylinder with a uniform circular cross section area and the cavity is filled pressure gas. The first projections 46 and the second projections 47 positioned at the edge of the through hole 41 may be configured to have an interference fit with the first region 33 and the second region 34 of the inner surface of the cushion 40. For example, the interference may be in a range of about 0.1 mm to about 0.5 mm. Such configuration can further prevent the connecting part 32 from be disengaged from the through hole 41. Further, the hanger 31 and the cushion 40 have a large contact area. In some embodiments, an outer profile of the connection portion 32 may be configured to match the profile of the through hole 41 and the profile of the first projections 46 and the second the projections 47 formed on the cushion 40.

Figure 8:
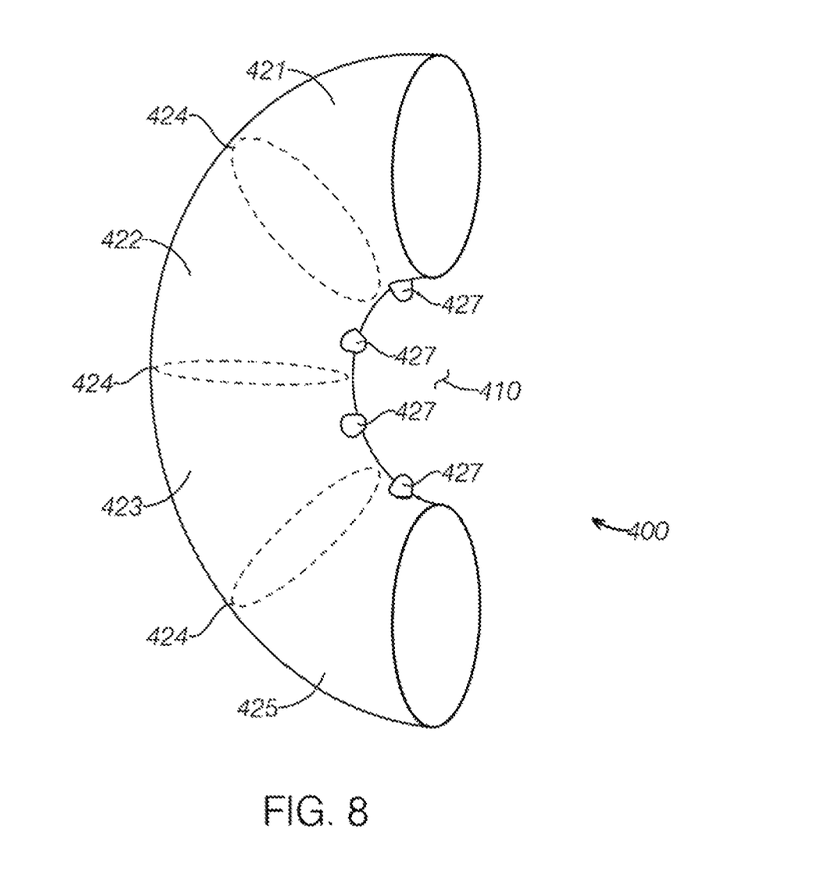
FIG. 8 schematically depicts a perspective partial view of a cushion of an isolator according to another embodiment of the present disclosure.

FIG. 8 shows a portion of a cushion of an isolator for an exhaust system according to another embodiment of the present disclosure. As shown in FIG. 8, the cushion 400 includes a plurality of sealed cavities 421, 422, 423, and 425 distributed along a circumference of a through hole 41 410, which are formed by separating walls 424 disposed on the cross-sections of the cushion 400. Cavities 421, 422, 423, 425 may have same or different sizes, and may be filled with gas having same or different pressure.

Each cavity may include an independent pressure adjustment device 427. The pressure adjustment device 427 may be a valve, or a protrusion or a weakened area made from an elastic material and may be positioned at the cushion. By opening the valve, or cutting the protrusion or the weakened area, the sealing of the cavity is removed to release the gas. Thus, the rigidity of the cushion 400 in the isolator can be adjusted by removing the sealing in one or more cavities to meet requirements of different types of the vehicle. Such design can avoid a process of filling/releasing gas to adjust pressure in the cushion 400 on site, but still enables the adjustment on a rigidness of the cushion 400, therefore, and thus further enhances versatility.

In one or more embodiments, the isolator of the present disclosure comprises a gas filled cushion, which save material and improve the isolation to the vibration. The direction connection of the through hole of the gas filled cushion with the hanger increase the contact area such that the vibration can be absorbed effectively and the relative movement between the isolator and the hanger is reduced. Further, the isolator includes a valve to adjust gas pressure inside the cushion. In this way, stiffness of the isolator may be adjusted by the valve to meet the requirement for specific type of vehicles. Compared to the conventional isolator designed for specific vehicle type, the isolator of the present disclosure is versatile and can fits different types of vehicles. As the pressure in the cushion can be adjustable, the isolator can be used in a research and development stage of an engine and an exhaust system to determine the optimal stiffness. Stiffness of the isolator can also be changed by using different type of gas. In addition, the bracket with pivotal connection can facilitate assembling and disassembling of the isolator to the exhaust system, which enhance the efficiency.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and sub-combinations of the various elements, features, functions and/or properties disclosed above and inherent to those skilled in the art pertaining to such inventions.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application.

The invention claimed is:

1. An isolator in an exhaust system of a vehicle, comprising:
a bracket to be connected with an under body of the vehicle; and
a gas filled cushion at least partially embedded in the bracket, wherein the cushion is formed to have at least one through hole in a middle portion and the through hole is configured to receive a hanger connected to an exhaust system, and
wherein the cushion includes a plurality of hermetically sealed cavities surrounding the through hole, at least one of hermetically sealed cavities is capable of being unsealed for gas pressure adjustment.

2. The isolator of claim 1, wherein the bracket includes two arms pivotably connected with each other at one end, and the cushion is embedded in the two arms.

3. The isolator of claim 2, wherein the two arms of bracket are releasably connected with each other on another end through a locking device to lock the cushion in the bracket.

4. The isolator of claim 1, wherein the cushion has an annular ring shape and is made of elastic material and wherein the bracket has a corresponding annular inner wall.

5. The isolator of claim 1, wherein the cushion is hermetically sealed and filled with the gas at a predetermined pressure.

6. The isolator of claim 5, wherein the cushion further comprises a valve to charge the gas and adjust a gas pressure in the cushion.

7. The isolator of claim 5, wherein the cushion includes one hermetically sealed cavity surrounding the through hole.

8. The isolator of claim 1, wherein a wall of the through hole formed by an inner surface of the cushion includes a plurality of projections configured to prevent the hanger from sliding away from the cushion.

9. An exhaust system for a vehicle having a vehicle underbody, the exhaust system comprising:
a hanger;
an exhaust pipe connected to the hanger;
a rigid bracket to be connect with the vehicle underbody;
a gas filled cushion at least partially embedded in the rigid bracket, wherein the cushion has an annular ring shape and includes a through hole to receive the hanger, and
wherein the cushion includes a plurality of hermetically sealed cavities surrounding the through hole, at least one of hermetically sealed cavities is capable of being unsealed for gas pressure adjustment.

10. The exhaust system of claim 9, wherein the rigid bracket includes two arms pivotably connected with each other at one end via a pivot, a cross-section of the two arms has a U shape, and wherein the cushion is embedded in the two arms.

11. The exhaust system of claim 10, wherein the two arms of the rigid bracket are releasably connected with each other on another end via a locking device to lock the cushion inside the rigid bracket, and the two arms collectively form an annular shape corresponding to the cushion when connected on both ends.

12. The exhaust system of claim 9, wherein the cushion is made from elastic material, and wherein the rigid bracket is made from metal, or alloy.

13. The exhaust system of claim 9, wherein the cushion includes a valve to charge and discharge gas and configured to adjust a gas pressure inside the cushion.

14. The exhaust system of claim 9, wherein the cushion includes one hermetically sealed cavity surrounding the through hole.

15. The exhaust system of claim 9, wherein a wall of the through hole formed by an inner surface of the cushion includes a first plurality of projections adjacent to a first main surface of the cushion and along a circumference of the through hole and a second plurality of projections adjacent to a second main surface of the cushion and along the circumference of the through hole, wherein the first main surface is opposite to the second main surface, and wherein the first and second plurality of projections are configured to prevent the hanger from being disengaged from the cushion.

16. The exhaust system of claim 15, wherein the hanger includes a connection portion to be disposed inside the through hole of the gas filled cushion, the connection portion has a first region and a second region having varied cross-sectional areas, wherein cross-sectional areas adjacent to the first and second plurality of projections are greater than cross-sectional areas between the first and second plurality of projections.

17. An isolator in an exhaust system of a vehicle, comprising:
   an annular rigid bracket, wherein the annular rigid bracket includes at least one protrusions having a connection hole for connection with an underbody of the vehicle; and
   a gas filled cushion disposed in the rigid bracket, wherein the cushion has an annular ring shape and a through hole, wherein gas is filled in a cavity of the cushion, wherein the through hole of the cushion configured to receive a hanger connected to an exhaust system, and wherein the cushion includes a plurality of hermetically sealed cavities surrounding the through hole, at least one of hermetically sealed cavities is capable of being unsealed for gas pressure adjustment.

18. The isolator of claim 17, wherein the cushion is made of elastic material and the cushion includes a valve to control a gas pressure in the cushion so as to vary stiffness of the cushion, and wherein the gas is an air, nitrogen or an inert gas.

* * * * *